June 20, 1967
L. D. THOMAS
3,327,121
LASER BEAM MODULATOR
Filed Jan. 18, 1965
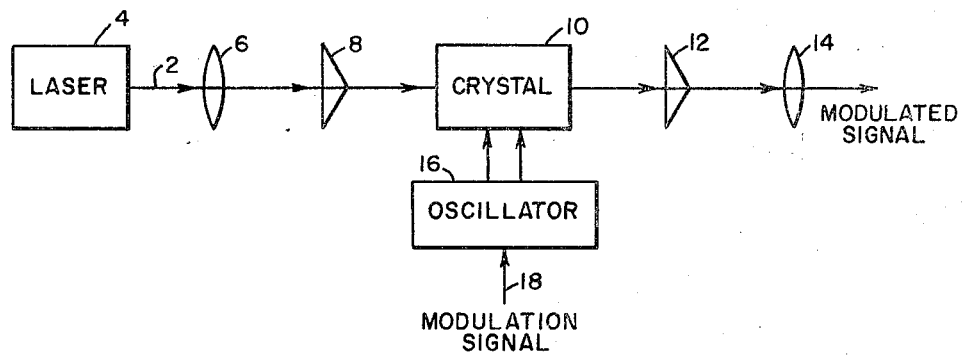
FIG. I.
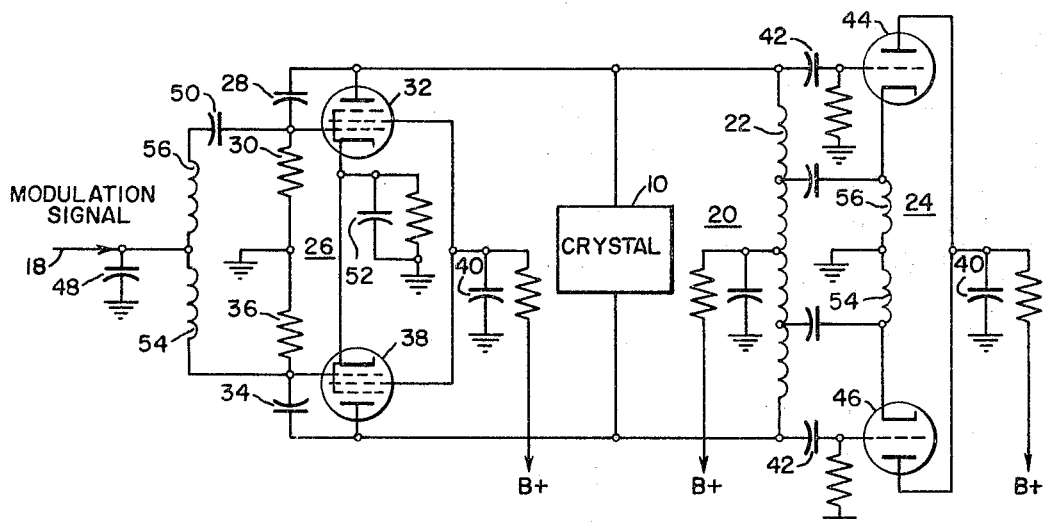
FIG. 2.
WITNESSES:
Bernard R. Gieguer
James F. Young
INVENTOR
Leslie D. Thomas
BY Ernest P. Klipfel
ATTORNEY

United States Patent Office 3,327,121
Patented June 20, 1967

3,327,121
LASER BEAM MODULATOR
Leslie D. Thomas, Catonsville, Md., assignor to Westinghouse Electric Corporation, Pittsburgh, Pa., a corporation of Pennsylvania
Filed Jan. 18, 1965, Ser. No. 426,345
3 Claims. (Cl. 250—199)

The present invention relates generally to laser beam modulators and more particularly relates to a coherent light beam modulator electrically connected in the tuned circuit of a modulator oscillator.

In laser communication systems, a common method of putting intelligence on the coherent light beam is to amplitude modulate the beam by a sub-carrier signal which is itself frequency modulated by the intelligence signal. The coherent light beam passes through a crystal, such as a Pockel's cell, on which a varying electric field is applied at the sub-carrier frequency. The crystal splits the beam into two components, one retarded with respect to the other since the field causes the index of refraction for each component to vary. When the components recombine into one beam again, its amplitude is less than the amplitude of the original beam. The indices of refraction vary in response to the frequency modulation of the sub-carrier in accordance with the intelligence to be transmitted. Thus, the relative simplicity of a Pockel's cell or similar type of absorption modulator is combined with the advantages of frequency modulation such as noise improvement, removal of effects of fading and insensitivity to amplitude non-linearity.

However, large modulating voltages and currents are required to provide a sufficient variance in the indices of refraction within presently available crystals such as potassium dihydrogen phosphate (KDP) so as to produce a meaningful amplitude modulation of the coherent light beam. The necessary reactive current is quite large even though the power dissipated by the crystal is relatively small. No real problem is presented so long as the information bandwidth is small and the crystal can be part of a high Q tuned circuit. If, however, the required bandwidth of the sub-carrier frequency signal is relatively large such as needed for FM television then to obtain the wide bandwidth for a tuned circuit, wherein the crystal capacity is part of the tuned circuit, a large amount of RF power is required most of which is dissipated in damping resistors and circuit losses. Use of networks with the crystal constituting a component of the network reduces the power requirement somewhat but very large powers are still needed for the sub-carrier driver. Less pecentage modulation has to be accepted or a high power device must be provided. As a result, where a wide band signal is to be transmitted, a substantially lower percentage modulation of the light beam is usually accepted. Since the power is proportional to the square of the percentage amplitude modulation, reduction of the modulation index to say 25% would reduce the power required to a few watts. However, this reduction causes a 12 db reduction in the system signal to noise ratio and is therefore highly undesirable from a system point of view.

An object of the present invention is to provide a laser beam modulator capable of a large modulation index with only reasonable power requirements.

Another object of the present invention is to provide a modulator for a coherent light beam wherein substantially 100% amplitude modulation may be obtained with considerably reduced power dissipation.

Another object of the present invention is to provide a laser beam modulator wherein the bandwidth of the sub-carrier frequency may be greater than heretofore available.

Briefly, these and other objects of the present invention are attained by electrically connecting the modulator crystal into the tank circuit of an oscillator at the sub-carrier frequency. The crystal capacity is made a substantial part of the tuned circuit of the oscillator so that large electric fields may be produced across the modulator to allow substantial amplitude modulation of the coherent light beam with little power loss in the system.

The objects will be more readily apparent from the following detailed description taken in conjunction with the drawing, in which:

FIGURE 1 is a schematic diagram of an illustrative embodiment of the present invention; and FIG. 2 is an electrical schematic diagram of circuitry for impressing the frequency modulated subcarrier signal across the modulating crystal.

A coherent light beam 2 to be modulated is emitted from a laser source 4 directed through a collimator 6 and Nicol prism 8 to a Pockel's cell or crystal 10. The crystal 10 divides the light into two components and changes their relative velocities by rotating their phase of polarization in accordance with the electric field thereacross. The field varies at a sub-carrier frequency modulated by the intelligence to be transmitted. Amplitude modulated light is produced when the beam 2 passes through another Nicol prism 12, and hence to the collimator 14 and receiver or target (not shown). An oscillator 16 provides the electric field across the crystal 10 at the sub-carrier frequency. The variations in the indices of refraction within the crystal 10 are determined by the magnitude and frequency of the electric field applied across the cell 10. A modulation signal 18 frequency modulates the sub-carrier frequency signal from the oscillator 16 in accordance with the intelligence to be transmitted.

The crystal 10 acts as a dielectric between its two electrodes or sides and has an equivalent capacitance therebetween. Referring to FIG. 2, the crystal 10 is connected in the tuned circuit 20 including an inductance element 22. An oscillator 24, preferably of the push-pull type, sustains oscillations in the tank circuit 20 in the usual manner of feeding energy from the plate circuit into the grid circuit. A push-pull oscillator is advantageously utilized to permit sizable peak-to-peak RF voltages to be produced with a reasonable plate supply voltage B+ and with the use of fairly small tubes. The crystal capacity plus stray capacitance and a trimmer capacitor (not illustrated, but which may be used if desired) form the capacitance part of the tank circuit 20.

A frequency modulator 26 preferably of the push-pull type, is connected in the usual manner to the oscillator tank 20 to frequency modulate the subcarrier signal in accordance with the information to be transmitted. A first phase shifter of capacitor 28 and resistor 30 causes the first tube 32 to provide reactance current which lags by 90° with respect to the tank voltage while a phase shifter of capacitor 34 and resistor 36 causes the tube 38 to provide 90° leading current variations to the tank circuit with respect to its voltage. If the modulator tubes 32 and 38 are each operated as a linear grid modulator, it can be seen that the frequency deviation $\Delta F$ will be approximately proportional to $1/1\sqrt{E_m}$ where $E_m$ is the instantaneous modulating voltage of the intelligence signal. The reactance tubes change the capacitance value of the crystal 10 or inductor 22 in the oscillator tank by an amount $\Delta C$ (or $\Delta L$) where the change in capacitance or reactance is proportional to $E_m$. The result is a varying of the voltage across the cell 10 in the tank circuit 20. Bypass capacitors 40 isolate the power supply B+ while capacitors 42 act as feedback coupling condensers toward the oscillator grid of each tube 44 and 46 of the oscillator circuit 24. Capacitor 48 isolates the intelligence input signal as does capacitor 50. Condenser 52 acts as a forward coupling capacitor. High frequency chokes 54 and 56 isolate the RF signal to the remainder of the circuit.

The modulation input intelligence signal 18 is connected to drive the reactance modulator 26 in a conventional manner. The operation of a reactance tube modulator is well known and further reference to its operation is made to "Frequency Modulation" by August Hund (McGraw-Hill), 1942, pages 155–182.

Modulation of the sub-carrier frequency signal is by direct frequency modulation through the reactance tubes. If desired, automatic frequency control may be applied in the usual manner, either electrically or electro-mechanically. However in a laser system, there are no frequency allocation problems, and one could operate with no automatic frequency control using either a wider band receiver or a frequency following receiver.

The modulation linearity depends chiefly on the transfer characteristics of the reactance tubes that are used. With proper type receiving tubes very good linearity can be obtained, especially if use is made of a suitable predistorter. In the event that linearity is not adequate for a particular application, the output of the reactance modulator 24 can be compared in a wideband phase detector with the output of a low power modulator of adequate linearity, such as the RC phase shift oscillator type or a linearized reactance modulator with the optimum tube types. The error signal from this phase detector will then drive the input to the reactance tubes, so that this modulator will be phase locked to the linear modulator, and, with correct choices of parameters of the feedback network, and a linear phase detector, it will be caused to have essentially the same linearity as the linear unit.

Thus, the present invention provides readily obtainable circuitry for providing sufficient magnitude of voltage across a Pockel's cell to obtain 100% amplitude modulation of the coherent light beam 2. If, for example 800 volts peak-to-peak is required at 70 megacycles frequency of the sub-carrier signal for a Pockel's cell having 20 micromicrofarads capacity, a single dual tetrode tube such as a type 832A would only have about 15 watts plate dissipation. The reactance tubes would be the same or a similar tube. Smaller tubes could probably be used than these examples. Such losses compare favorably with a tube in the order of 125 watts plate dissipation needed to get the 77 watts at 70 megacycles per second in a wideband amplifier, of which over 76 watts would be dissipated in damping resistors and circuit losses.

While the present invention has been described with a degree of particularity for the purposes of illustration, it is to be understood that all modifications, alterations and substitutions within the spirit and scope of the present invention are herein meant to be included. For example, in addition to the frequency modulation described, the Pockel's cell may form part of the capacitive element of an oscillator which is directly amplitude modulated by the intelligence to be transmitted.

I claim as my invention:

1. In a communication system for modulating a coherent light beam by a sub-carrier signal which is modulated by an intelligence signal, the combination, comprising; oscillator means including a circuit tuned to a resonance at the sub-carrier frequency; a Pockel's cell connected in said tuned circuit, the cell capacity providing the capacitance part of the tuned circuit; said cell disposed in the path of the coherent light beam for varying the propagation of said beam in response to the electric field across the cell; and means for frequency modulating the sub-carrier frequency signal in the tank circuit in response to intelligence to be transmitted by the coherent light beam.

2. In a communication system for modulating a coherent light beam by a sub-carrier which is modulated by an intelligence signal, the combination comprising; an oscillator including a circuit tuned to resonance at the sub-carrier frequency; a Pockel's cell disposed in the path of said coherent light beam for varying the propagation of said beam in response to an electric field thereacross; said cell electrically connected in circuit combination in the tuned circuit of said oscillator, the capacity of said cell being a substantial part of the capacitance of the tuned circuit; and means for modulating the frequency of said sub-carrier frequency signal in accordance with the intelligence signal.

3. The apparatus of claim 2 wherein said means for modulating is a reactance tube modulator circuit.

References Cited

UNITED STATES PATENTS

| | | | |
|---|---|---|---|
| 1,792,752 | 2/1931 | Michelssen | 250—199 |
| 2,613,320 | 10/1952 | Panetta | 331—158 |
| 2,718,593 | 9/1955 | Felix | 331—158 X |
| 2,788,710 | 4/1957 | West | 250—199 |
| 3,126,485 | 3/1964 | Ashkin et al. | 250—199 |
| 3,214,590 | 10/1965 | Schactman | 250—199 |

DAVID G. REDINGBAUGH, *Primary Examiner.*

J. W. CALDWELL, *Assistant Examiner.*